March 11, 1952 W. E. PRICE, JR 2,588,872
DISK CULTIVATOR
Filed July 29, 1946 3 Sheets-Sheet 1

Inventor
Walter E. Price, Jr.
By
Attorney

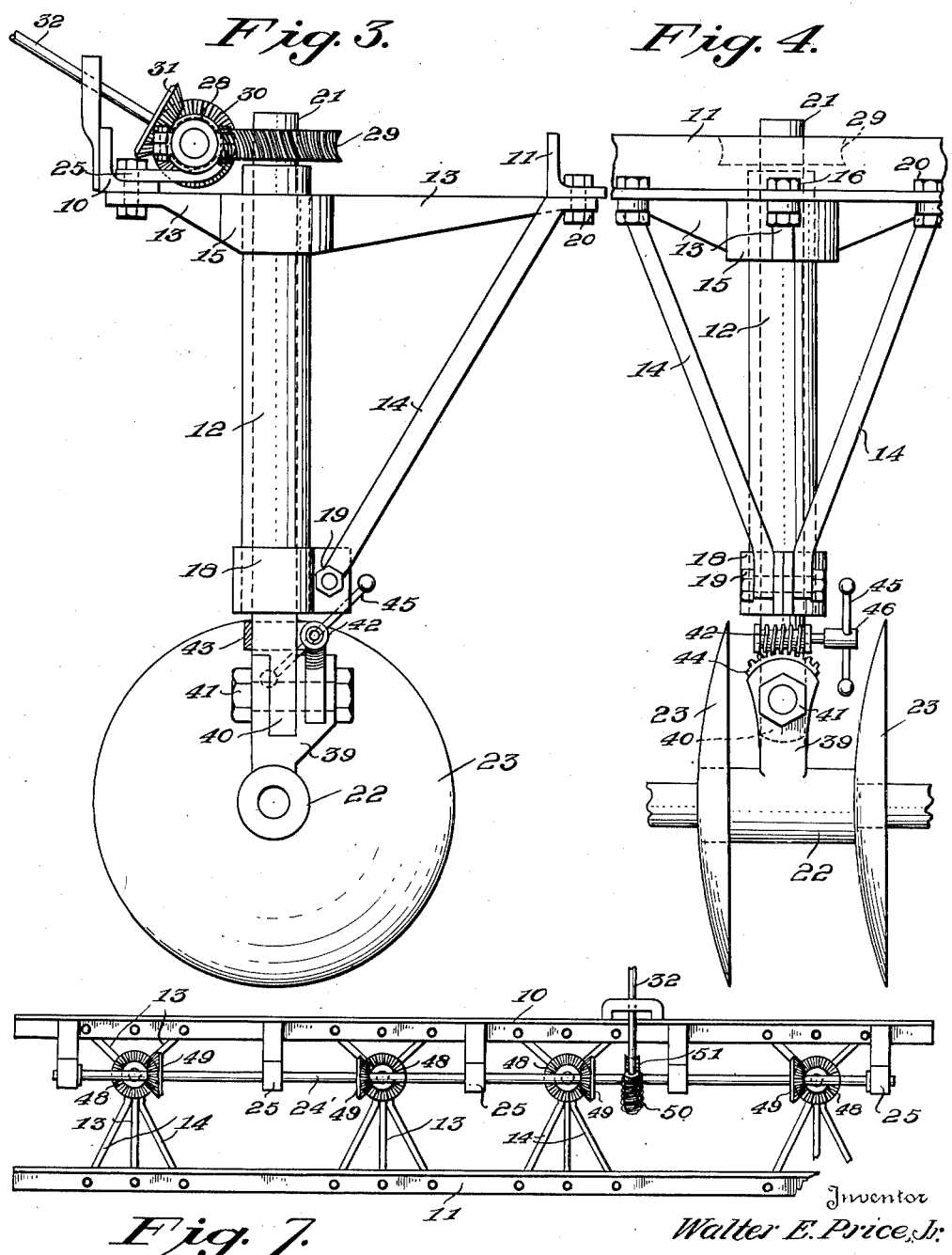

March 11, 1952  W. E. PRICE, JR  2,588,872
DISK CULTIVATOR
Filed July 29, 1946  3 Sheets-Sheet 3
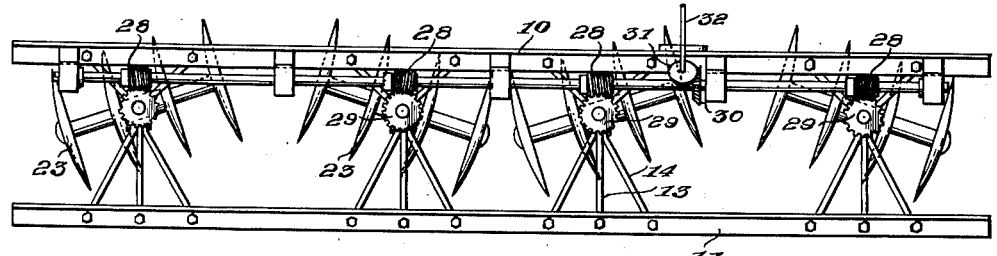
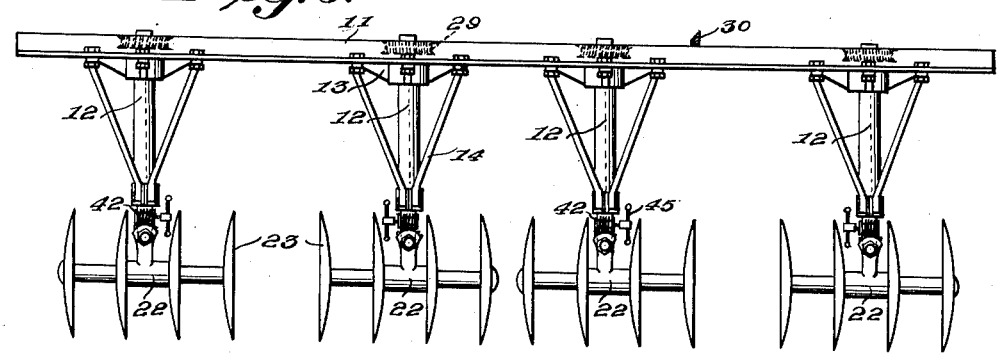
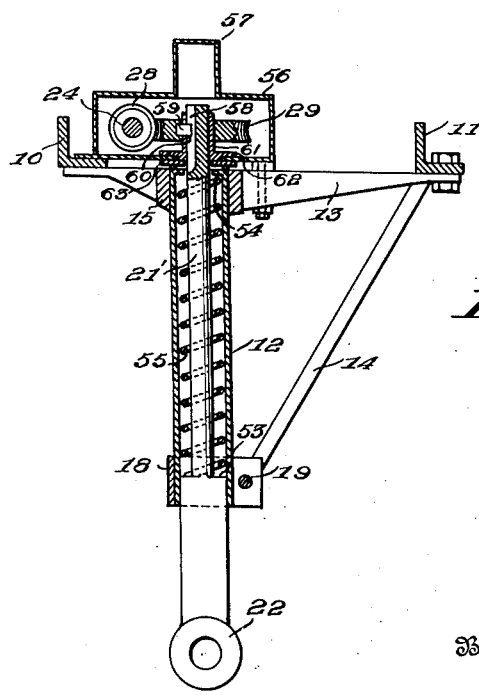
Inventor
Walter E. Price, Jr.
By 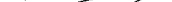
Attorney Patented Mar. 11, 1952

2,588,872

UNITED STATES PATENT OFFICE 2,588,872

DISK CULTIVATOR

Walter E. Price, Jr., Clinton, Miss.

Application July 29, 1946, Serial No. 686,897

6 Claims. (Cl. 97—54)

This invention relates to a disk cultivator. The invention is more particularly concerned with improvements in disk cultivators and particularly those which are adapted for ready operative connection to and adjustment from a tractor, a horse drawn vehicle, or the like.

Disk cultivators of the construction forming the subject matter of the present application are well known and embody a supporting frame having one or more pairs of disks, or gangs of disks, mounted on substantially horizontal axles beneath the frame, which disk supporting axles are in turn carried by vertically disposed members which in some instances are shafts, depending from the frame. Certain of the disks or gangs of disks are adapted for operation at opposite sides of a drill or planted rows or hills, and in some instances have been mounted for adjustment about vertical axes whereby the disks may be disposed parallel with the drill for breaking up the ground on each side thereof, or set at an angle to the drill for throwing the soil to or pulling it from the drill, dependent upon whether the disks diverged from or converged toward the line of drill considered in the direction of movement of the cultivator.

The importance of such adjustment of gangs of disks for disposal at opposite sides of the drill has long been recognized and many different forms of adjustment have been provided or proposed. In some of the prior cultivator constructions (as in Patent 508,028) the disks or the disk gangs have been constructed for individual adjustment. Such constructions, however, offered several objections, the principal one of which was that the disks at opposite sides of the drill could not be adjusted equally with any certainty with the result that more dirt would be thrown to or pulled from one side of the drill than the other.

Furthermore, such form of adjustment required greater effort upon the operator as well as an expenditure of considerable time. This individual adjustment of the disks or disk gangs has, however, been overcome in some prior constructions wherein two or more disks or gangs of disks are simultaneously adjustable. In such prior constructions, however, where means is provided for simultaneously adjusting the several disks or gangs of disks it is necessary to lock and unlock the operating elements of the adjusting means prior to and subsequent to any adjustment. Also, in some such prior constructions, the adjusting means embodies flexible elements which fail to hold the disks in the necessary rigid adjusted position.

A primary object of this invention accordingly is to provide a cultivator embodying a frame having two or more pairs of disks or gangs of disks supported thereby on substantially horizontal axles which are simultaneously adjustable about vertical axes by a single manual control member, and wherein the disks remain rigidly fixed in any adjusted position thereof without the use of separate manually operative locking means.

A further object of the invention is the provision of a cultivator attachment including a frame for connection with a tractor or horse drawn vehicle, from which frame depend vertical rotatable axles to the lower end of each of which is attached an axle supporting one or more disks, the vertical shafts having gear connection with a horizontal shaft supported by the frame, and a crank shaft having gear connections with the horizontal shaft, the gear connections between the horizontal and vertical shafts being arranged for opposite rotation of adjacent vertical shafts upon rotation of the horizontal shaft, and certain of said gear connections comprising a cooperating worm and gear for retaining the vertical shafts and disks supported thereby in any adjusted position thereof.

A still further object of the invention is the provision of a disk cultivator of the above noted character wherein the axles and disks journalled thereon are capable of adjustment in the vertical planes of the axes of the axles for varying the amount of ground thrown to or pulled from the drill in any adjusted position of the axles about vertical axes.

A still further object of the invention is the provision of a disk cultivator of the above noted character wherein the disk supporting axles are yieldably supported for allowing the disks to ride over obstructions without damage thereto.

A still further object of the invention is the provision of a disk cultivator of the above noted character wherein the disk supporting axles are capable of rotation throughout 360° about vertical axes whereby the disks are readily positionable for throwing ground to or drawing ground from the drill.

With the above and other objects in view, the invention consists of the novel features of construction, combination and arrangement of parts hereinafter fully described and claimed, and as illustrated in the accompanying drawings, wherein—

Fig. 3 is a left hand end elevation of the attachment;

Fig. 4 is a rear elevation of a portion of the attachment;

Fig. 5 is a top plan view of the attachment on a reduced scale;

Fig. 6 is a rear elevation of the attachment on the scale of Fig. 5;

Fig. 7 is a top plan view of a modified form of the invention; and

Fig. 8 is a transverse vertical section showing a modified form of support for the disks.

Figure 2:
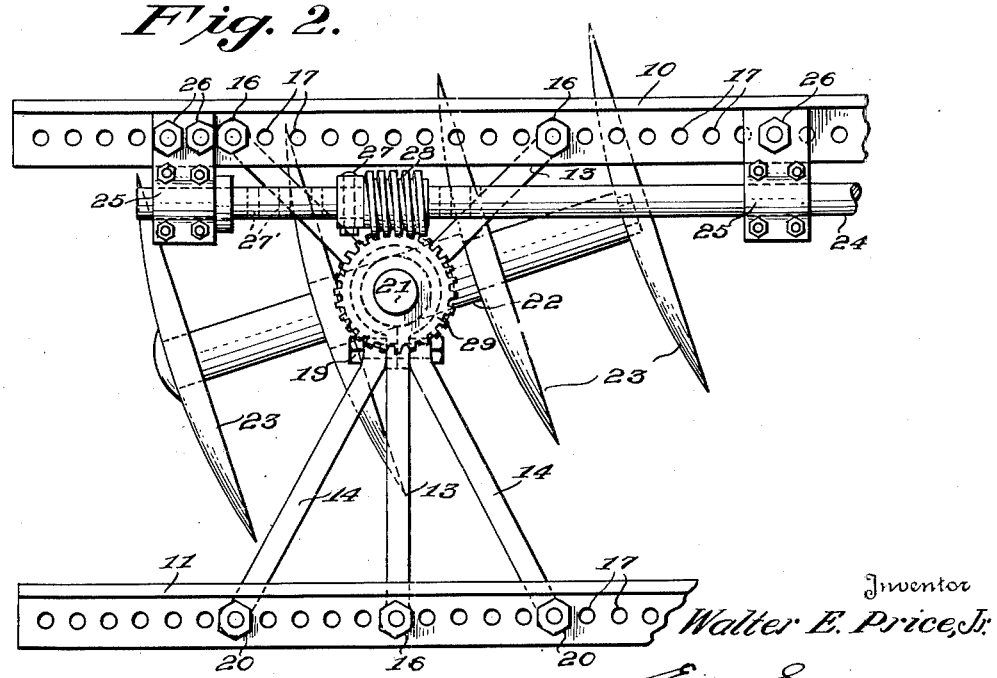
Fig. 2 is a top plan view of a portion of the attachment showing particularly, one gang of disks and its adjustable connection with the horizontal shaft.

Referring now in detail to the drawings, a supporting frame is provided which embodies a pair of parallel and horizontally disposed spaced angle bars 10 and 11. A plurality of cylindrical shaft housings 12 are vertically suspended from and rigidly secured to the angle bars by means of horizontal brace bars 13 and angularly disposed brace bars 14. The brace bars 13 radiate from a sleeve member 15 engaged with and suitably secured to the housing and the free ends of the brace bars are connected to the angle bars by bolts 16 receivable in any of the consecutive apertures 17 in the angle bars. The angular brace bars 14 have their lower ends secured to a housing engaging clamp member 18 by means of a bolt 19 and the bars 14 diverge upwardly from the bolt 19 and have their free ends secured to the angle bar 11 by means of bolts 20 received in selected ones of the apertures 17 and the bolts 20 are transversely alined with the front bolts 16 as is indicated in Fig. 2.

A vertically disposed shaft 21 is disposed within each housing 12 and each such shaft at its lower end is rigidly connected with a disk axle bearing 22 by which are rotatably supported a plurality of disks 23 preferably, but not necessarily, four such disks are rotatably supported by each bearing.

While the shafts 21 are rotatable throughout 360° on their axes, they are nevertheless retained against rotation in operation of the cultivator, the disks only being rotatable during such operation.

The essential feature of this invention is the provision of means readily operative by a workman sitting on the seat s of the tractor for simultaneously rotating the shafts 21 to any position throughout a range of 360°, with alternate ones thereof rotating in one direction and the others rotating in the opposition direction whereby to set the axes of the disks 23 at angles relative to the common vertical plane of the axes of shafts 21 as is indicated in Fig. 5, the disk axes being shown in alinement in Fig. 6 for better illustration of other sructural features.

This means in accordance with a practical embodiment of the invention comprises a horizontal shaft 24 rotatably supported in bearings 25 secured to bar 10 by means of bolts 26 engageable in selected ones of the apertures 17. The shaft 24 is cylindrical and secured thereto by means of bolts 27 engageable in selected ones of apertures 27' therein are a plurality of worms 28, with the pitch of adjacent worms reversed, as indicated in Fig. 5.

Each worm 28 meshes with a worm gear 29 secured to the upper end of a shaft 21 whereby upon rotation of shaft 24 through a desired angular range thereof, the shafts 21 will be rotated with adjacent ones thereof in opposite directions with a corresponding shifting of the axes of the groups of disks 23 about the axes of shafts 21, and the meshing worms and gears will act as a lock to retain the disk axes in any adjusted angular position.

Since the shafts 21 are rotatable through a range of 360°, the disk gangs can be adjusted to row, throw ground to or pull ground from the drill at the will of the operator. In order to impart rotation to shaft 24 the same is provided with a bevel gear 30 with which meshes a companion bevel gear 31 secured to a shaft 32 which is provided with an operating crank 33 within easy reach of a workman sitting on the seat s of the tractor T.

Figure 1:
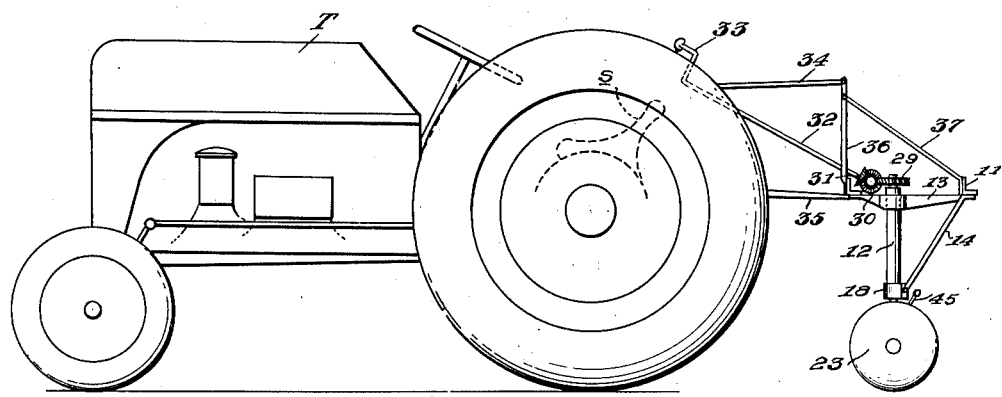
Figure 1 is a side elevational view, more or less diagrammatic in character and showing the improved disc cultivator in operative connection with a tractor.

The frame embodying bars 10 and 11 is removably connected with the tractor by means of upper and lower arms 34 and 35, respectively, the lower arms 35 being connected to bar 10 and the upper arm 34 being connected to the upper ends of arms 36, and to which adjacent ends of arms 37 are connected with their opposite ends connected to bar 11. This connection of the frame with the tractor is shown in Fig. 1 and while it is a preferred structure, other means of connection may be used, particularly if the attachment be used with other makes (or models) of tractors for which this can be adapted for mounting on the front, middle, or rear of chassis according to their customary mounting of cultivating attachments, or to horse drawn vehicles.

The invention includes means for adjusting the disk axes in a vertical plane thereof for setting the disks at an angle to the vertical for varying the amount of ground thrown to or pulled away from the drill and such means in a preferred embodiment thereof comprises an adjustable pivot joint in each shaft 21 adjacent the respective bearing 22, and as shown in Figs. 3 and 4, such joint is formed by the provision of a bifurcated lug 39 rigid with the bearing 22 and which receives a tongue 40, and a pivot bolt 41 extends through the tongue 40 and opposed portions of the lug 39. A worm 42 is rotatably supported in opposed arms of a bracket 43 secured to shaft 21 and which worm meshes with a toothed sector 44 supported within the lug 39. The worm may be rotated by a bar 45 extending through an extension 46 on the worm.

Upon reference to Fig. 2 it will be seen that by the provision of the apertures 17 in bars 10 and 11 and the apertures 27' in the horizontal shaft 24, the disk gangs may be adjusted lengthwise of the frame for varying the spacing therebetween, it being necessary only to shift bolts 16 and 20 to other apertures 17 in the frame bars 10 and 11, and likewise shift the worm retaining bolts 27 to other apertures 27' in the shaft 24, apertures 17 and 27' being equally spaced as shown.

From the foregoing, it will be seen that upon rotation of shaft 24 by means of crank shaft 32, the vertical shafts 21 will be rotated with adjacent ones thereof in opposite directions as a result of which the disk supporting axles may be axially alined as in Fig. 6, they may be moved to the angular position of Fig. 5 for throwing ground to the drill or they may be reversed from the position of Fig. 5 for pulling ground away from the drill and the angularity can be varied to suit any cultivating conditions.

By the use of the cooperating worms and worm gears on shafts 24 and 21 the disks will be automatically locked in any adjusted position thereof, and since all the vertical shafts 21 are simultaneously driven from shaft 24, the angular adjustment of the various gangs of disks will be equal.

While as a preference I have disclosed four disks to each gang, the invention is not limited thereto since each gang may embody a less number of disks, and while four gangs are disclosed for cultivating two rows at a time a greater or lesser number may be employed with the improved adjusting means in accordance with the present invention.

While the form of drive above described is preferred, the shafts 21 and 24 may be provided with cooperating bevel gears 48 and 49 respectively, as shown in Fig. 7.

In order to preclude reverse rotation of the shafts or to lock them in adjusted position the crank shaft 32 is provided with a worm 50 which meshes with a worm gear 51 on the horizontal shaft 24.

It may be found desirable to provide for vertical movement of the groups of disks supported by the various bearings 22 such as upon meeting roots or other obstacles, and furthermore, housings for the cooperating worms 28 and gears 29 may be found desirable and accordingly a modified form of structure embodying these features is illustrated in Fig. 8. As shown, the housing 12 terminates below the bars 10 and 11 or within the brace bar sleeve member 15 and the shaft 21' is reduced in the provision of a shoulder 53 between which and a flange 54 on the upper end of housing 12, a coil spring 55 is compressed, whereby providing for vertical yielding of the shaft 21' and disk supporting bearing 22. A housing 56 is supported between the angle bars 10 and 11 for each cooperating worm 28 and gear 29 and the housing includes a vertical extension 57 within which the shaft is movable upon upward movement thereof against the action of spring 55. In order to retain gear 29 in operative association with worm 28 and provide for vertical movement of shaft 21' the latter is provided wih a groove 58 in which projects a driving key 59 which projects into a recess in the gear and through an aperture 60 in a rotatable sleeve 61. The sleeve 61 has rotatable bearing with the base of housing 56 through fixed and removable flanges 62 and 63.

Thus, with this construction the worms 28 and gears 29 will remain in mesh while the disks will be free to move vertically upon being subjected to obstacles in the operation of the cultivator. The adjusting means of Figs. 3 and 4 may, if desired, be used in the lower larger sections of the shafts 21'.

Having set forth my invention in accordance with preferred embodiment thereof, what I claim and desire to secure by U. S. Letters Patent is:

1. In a cultivator, a frame, a plurality of horizontally spaced vertical housings supported by the frame in depending relation thereto, a vertical shaft rotatably supported in each housing, a disc supported by the lower end of each vertical shaft for rotation on a generally horizontal axis, a gear secured to the upper end of each vertical shaft, a horizontal shaft rotatably supported by the frame, gears on the horizontal shaft cooperating with the gears on the vertical shafts, and means for imparting rotation to the horizontal shaft, the housings being supported by the frame for adjustment in a direction axially of the horizontal shaft and the gears on the horizontal shaft being adjustable axially thereof whereby the spacing of the vertical shafts may be varied with a retention of the drive connection with the horizontal shaft.

2. In a cultivator, a frame including a pair of spaced, parallel and horizontally disposed bars, a plurality of vertically disposed cylindrical shaft housings in horizontally spaced relation and having their upper ends disposed between said bars, a sleeve member secured to each housing adjacent its upper end, horizontal brace bars radiating from said sleeve and having their ends rigidly connected with said pair of bars, a clamp member engaged with each housing adjacent the lower end thereof, a brace bar having its opposite ends rigidly connected to said clamp member and one of said pair of bars and disposed in angular relation to the housing, a vertical shaft rotatably supported in each housing with its upper and lower ends projecting from the corresponding ends of the housing, a disk supported by the lower end of each vertical shaft for rotation on a generally horizontal axis, a gear secured to the upper end of each vertical shaft, a horizontal shaft rotatably supported by one of said pair of bars, gears on the horizontal shaft cooperating with the gears on the vertical shafts, and manually operable means for imparting rotation to the horizontal shaft.

3. The structure according to claim 2, wherein said disk is rotatably supported by a cylindrical bearing having its axis disposed at right angles to the axis of the vertical shaft and in a common vertical plane, and said bearing being adjustably supported by the lower end of the vertical shaft for movement of the axis thereof in said vertical plane.

4. In a cultivator, a frame, a vertical shaft rotatably supported by the frame in depending relation thereto, a horizontal shaft rotatably supported by the frame, cooperating gears on the horizontal shaft and the upper end of the vertical shaft, manually operable means for imparting rotation to the horizontal shaft for rotation of the vertical shaft through said gears, a disk rotatably supported by a bearing having a normally horizontal axis and having pivotal connection with the lower end of the vertical shaft on an axis transverse thereto, a gear sector rigid with the bearing, and a manually operable worm rotatably supported by the vertical shaft in meshing engagement with the sector for adjusting the axis of the bearing in the vertical plane thereof.

5. In a cultivator, a frame, a vertically disposed tubular housing depending from the frame and having its upper end rigidly supported thereby, a vertically disposed shaft rotatably supported in the housing and having its upper and lower end projecting from corresponding ends of the housing, a horizontal shaft rotatably supported by the frame and having a gear secured thereto in meshing engagement with a gear having driving connection with the upper end of the vertical shaft, a coil spring disposed within the housing and having its opposite ends bearing on vertically opposed shoulders on the housing and shaft for yieldably urging the shaft downwardly, a disk rotatably supported on the lower end of the vertical shaft, and said driving connection between said second gear and said vertical shaft providing for axial movement of the vertical shaft relative to said housing.

6. The structure according to claim 5, together with a housing supported by the frame in enclosing relation to said gears, and wherein said driving connection comprises a sleeve rotatably supported on the upper end of said vertical shaft and having vertically spaced flanges having a rotatable connection with said housing, a vertically disposed groove in the upper end of the vertical shaft, and a key extending through an aperture in the sleeve with its opposite ends disposed in said groove and a recess in said second gear.

WALTER E. PRICE, Jr.

REFERENCES CITED

The following references are of record in the file of this patent:

UNITED STATES PATENTS

| Number | Name | Date |
| --- | --- | --- |
| 455,709 | Freiburghouse | July 7, 1891 |
| 499,844 | Miller | June 20, 1893 |
| 544,012 | Spangler | Aug. 6, 1895 |
| 978,363 | Frantz et al. | Dec. 13, 1910 |
| 1,013,269 | Binns | Jan. 2, 1912 |
| 1,364,943 | McAdam | Jan. 11, 1921 |
| 1,388,930 | Burgess | Aug. 30, 1921 |
| 1,660,791 | Hickam | Feb. 28, 1928 |
| 1,760,940 | English | June 3, 1930 |
| 1,817,851 | Shelton | Aug. 4, 1931 |
| 2,320,624 | Love | June 1, 1943 |
| 2,344,397 | Drexler et al. | Mar. 14, 1944 |

FOREIGN PATENTS

| Number | Country | Date |
| --- | --- | --- |
| 28,814 | Great Britain | Dec. 21, 1911 |